United States Patent [19]
Watkins et al.

[11] Patent Number: 4,988,583
[45] Date of Patent: Jan. 29, 1991

[54] NOVEL FUEL CELL FLUID FLOW FIELD PLATE

[75] Inventors: David S. Watkins, Coquitlam; Kenneth W. Dircks, North Vancouver; Danny G. Epp, Delta, all of Canada

[73] Assignee: Her Majesty the Queen as represented by the Minister of National Defence of Her Majesty's Canadian Government, Ottawa, Canada

[21] Appl. No.: 400,734

[22] Filed: Aug. 30, 1989

[51] Int. Cl.$^5$ .................................. H01M 8/10
[52] U.S. Cl. ................................. 429/30; 429/34
[58] Field of Search .......... 429/34, 30, 38, 39, 429/72; 204/255, 257, 258, 263, 277, 278

[56] References Cited

U.S. PATENT DOCUMENTS

| | | | |
|---|---|---|---|
| 4,197,178 | 4/1980 | Pellegri et al. | 204/255 |
| 4,210,512 | 7/1980 | Lawrence et al. | 204/258 X |
| 4,214,969 | 7/1980 | Lawrance | 204/255 |
| 4,324,844 | 4/1982 | Kothmann | 429/26 |
| 4,339,322 | 7/1982 | Balko et al. | 204/255 |
| 4,571,288 | 2/1986 | Boulton | 204/257 X |
| 4,572,876 | 2/1986 | Spurrier | 429/34 |
| 4,608,144 | 8/1986 | Darwent | 204/257 |
| 4,631,239 | 12/1986 | Spurrier et al. | 429/39 |
| 4,684,582 | 8/1987 | Granata, Jr. | 429/39 |
| 4,686,159 | 8/1987 | Miyoshi | 429/39 |
| 4,696,870 | 9/1987 | Sasaki et al. | 429/34 X |
| 4,824,740 | 4/1989 | Abrams et al. | 429/34 X |

OTHER PUBLICATIONS

General Electric and Hamilton Standard LANL No. 9-X53-D6272-1(1984).
"Energy", The International Journal, 11(1/2), 13–94(1986).

Primary Examiner—Anthony Skapars
Attorney, Agent, or Firm—Nixon & Vanderhye

[57] ABSTRACT

The invention disclosed is a novel fluid flow field plate for use in a solid polymer electrolyte fuel cell. The plate includes in a major surface thereof, a continuous open-faced fluid flow channel which traverses the central area of the plate surface in a serpentine manner. The channel has a fluid inlet at one end for receiving a reactant gas and a fluid exhaust at the other end for removing excess reactant gas and reaction products from the cell.

36 Claims, 1 Drawing Sheet

NOVEL FUEL CELL FLUID FLOW FIELD PLATE

FIELD OF THE INVENTION

This invention relates to fuel cells. More particularly, this invention pertains to novel fluid flow field plates for use in solid polymer electrolyte fuel cells.

BACKGROUND OF THE INVENTION

A fuel cell is a device which generates electrical energy by converting chemical energy, derived from a fuel supplied to the cell, directly into electrical energy by oxidation of the fuel in the cell. A typical fuel cell includes a casing which houses an anode, a cathode and an electrolyte. Appropriate fuel material and oxidant are supplied respectively to the anodes and cathodes, the fuel and oxidant react chemically to generate a useable electric current, and the reaction end product is withdrawn from the cell. A relatively simple type of fuel cell involves use of hydrogen and oxygen as the fuel and oxidant materials, respectively. The hydrogen combines with the oxygen to form water while at the same time generating an electrical current. More specifically, hydrogen is consumed at the fuel cell anode releasing protons and electrons as shown in equation (1) below. The protons are injected into the fuel cell electrolyte. The electrons travel from the fuel cell anode to the anode terminal, through an electrical load, back to the cathode terminal, and into the cathode of the cell. At the cathode, oxygen, electrons from the load and protons from the electrolyte combine to form water as shown in equation (2) below.

Anode Reaction

$$H_2 \rightarrow 2H^+ + 2e^- \qquad (1)$$

Cathode Reaction

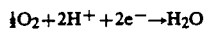

$$\tfrac{1}{2}O_2 + 2H^+ + 2e^- \rightarrow H_2O \qquad (2)$$

A great advantage of a fuel cell is that it converts chemical energy directly to electrical energy without the necessity of undergoing any intermediate steps, for example, combustion of a hydrocarbon or carbonaceous fuel as takes place in a thermal power station.

Fuel cells can be classified into several types according to the electrolyte used. Modern relatively high performance fuel cells include electrolytes such as aqueous potassium hydroxide, concentrated phosphoric acid, fused alkali carbonate and stabilized zirconium oxide. The electrodes invariably include a catalyst for promoting the reactions that take place on respective electrodes in the fuel cells. Suitable catalysts include nickel, silver, platinum and, in the case of the stabilized zirconium oxide electrolyte, base metal oxides.

General Electric in the 1960's commenced work on the development of a solid polymer fuel cell (SPFC). Such a cell had a number of potential advantages. It could operate on a hydrogen containing fuel and an oxidant feed such as air or pure oxygen. In one embodiment, the SPFC could operate on reformed hydrocarbons such as methanol or natural gas as the fuel source and air as the oxidant.

Since the electrolyte in a SPFC is solid, substantial pressure differences between the fuel and the oxygen streams can be tolerated. This simplifies pressure control and, in particular, allows for higher pressures to exist in the oxidant stream. This leads to increased performance, particularly when air is used as the oxidant.

An SPFC is advantageous in that it can be operated at temperatures below the boiling point of water at the operating pressure. Accordingly, water as the end product is generated in the liquid state.

More specifically, a typical SPFC uses a solid polymer ion exchange membrane as electrolyte between the anode and cathode. The solid polymer ion exchange membrane permits the transmission through the membrane of hydrogen ions, but is substantially impervious to the passage of hydrogen and oxygen molecules. The ion exchange membrane has thereon negatively charged sites chemically attached to the polymer. The ion exchange membrane is sandwiched between the anode and cathode. Typically, a platinum catalyst is added to the anode and cathode to increase the rate of reaction.

In a single cell arrangement, two fluid flow field plates (anode and cathode plates) are provided. The plates act as current collectors, provide electrode support, provide means for access of the fuel and oxidant to the anode and cathode surfaces, respectively, and provide for removal of water formed during operation of the cell.

The cell assembly is held together by tie rods and end plates. Feed manifolds are respectively provided to feed the fuel (hydrogen, reformed methanol or natural gas) to the anode and the oxidant (air or oxygen) to the cathode via the fluid flow field plates. Exhaust manifolds are provided to exhaust excess fuel and oxidant gases and water formed at the cathode. Multi-cell structures comprise two or more such sandwich combinations connected together in series or in parallel to increase the overall power output of the assembly as required. In such arrangements, the cells are typically connected in series, wherein one side of a given plate is the anode plate for one cell, and the other side of the plate is the cathode plate for the adjacent cell and so on.

DESCRIPTION OF THE PRIOR ART

A typical prior art fluid flow field plate includes in a major surface thereof a plurality of separate parallel open-faced fluid flow channels cut out of said major surface. The channels extend across the major surface between a feed fluid inlet and an exhaust outlet. The channels are typically of rectangular shape in cross-section, being about 0.03 inches deep and about 0.03 inches across the opening. The inlet is connected to a fuel or oxidant feed. In multi-cell arrangements both major plate surfaces may include flow channels. In operation, the flow channels supply fuel or oxidant to the electrode surface from the inlet. This prior art is exemplified by General Electric and Hamilton Standard LANL No. 9-X53-D6272-1 (1984).

It was found that when running the cell on air for extended periods of time that low and unstable voltages resulted. The problem was traced to the cathode side of the cell and specifically to cathode gas flow distribution and cell water management.

Specifically, when the fuel cell is operating continuously, that is, it is producing electric current and consuming fuel and oxygen on a continuous basis, liquid water is continuously produced at the cathode. Unfortunately, with this prior art plate, it has been found that the water formed at the cathode accumulates in the channels adjacent to the cathode. It is believed that as the water accumulates, the channels are wetted and the water thus tends to cling to the bottom and sides of the channels. The water droplets also tend to coalesce and form larger droplets. A force, which increases with the size and number of the droplets, is required to move the droplets through the channel. In the flow field of the prior art, the number and size of the water droplets in parallel channels will likely be different. The gas will then flow preferentially through the least obstructed channels. Water thus tends to collect in the channels in which little or no gas is passing. Accordingly, dead spots tend to form at various areas throughout the plate. It was therefore concluded that poor performance was caused by inadequate drainage of product water which results in poor gas flow distribution on the cathode side.

In the 1970's, General Electric manufactured and sold a 12 watt power generating unit under the trademark "PORTA-POWER". This unit included a plastic coated aluminum plate (non-electrically conductive) which had on one side (the hydrogen side) a single relatively wide (0.25 ins) traversing groove. This plate did not act as a current collector. Also, since the anode (hydrogen) side had the single groove, it was not for the purpose of conveying water from the unit i.e. product water is formed only on the cathode (oxygen) side. Furthermore, in the GE unit, the current collector was a Niobium metal screen (with electrical contact made at the edge of the electrode).

Another variation of the prior art flow field is described in U.S. Pat. No. 4,769,297 of Sept. 6, 1988 in the names of Carl A. Reiser et al. This reference describes a "waffle iron" flow field which involves a plurality of discontinuous fluid flow paths. Water is managed by use of porous flow field plates and hydrophillic separator plates. A pressure difference between the oxygen and hydrogen flow fields forces the water to flow out from the cell.

SUMMARY OF THE INVENTION

According to the invention, a novel fluid flow field plate for use in a solid polymer electrolyte fuel cell is provided, said plate being made of a suitable electrically conducting material and having formed in a major surface thereof a continuous open-faced fluid flow channel having a fluid inlet at one end and a fluid outlet at the other end, the fluid inlet and outlet being respectively directly connected to fluid supply and fluid exhaust openings defined in the plate, and wherein said channel traverses a major central area of said surface in a plurality of passes.

BRIEF DESCRIPTION OF THE DRAWING

Aspects of specific embodiments of the invention are illustrated, merely by way of example, in the accompanying drawings, and should not be construed as restricting the spirit or scope of the invention in any way.

DETAILED DESCRIPTION OF THE PREFERRED EMBODIMENTS OF THE INVENTION

Figure 1:
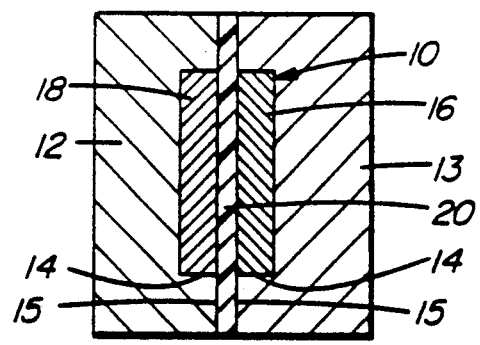
FIG. 1 is a side elevation in section of an electrode assembly incorporating fluid flow field plates of the present invention.

Referring to the drawing, as seen in FIG. 1, an electrode assembly 10 is supported between a pair of rigid fluid flow field plates 12 and 13. The electrode assembly 10 is located in central matching recesses 14 provided in opposing major plate surfaces 15, and includes an anode 16, a cathode 18 and a solid polymer electrolyte 20 sandwiched between the anode and cathode. It will be appreciated that a single recess could be provided in either of the plates to achieve the same result.

The fluid flow field plates are made of a suitable electrically conducting material. A rigid, non-porous graphite plate has been found useful for most applications. Graphite is preferred because it is chemically inert in the environment used and inexpensive. Other suitable materials include corrosion resistant metals such as niobium; less corrosive resistant base metals such as magnesium or copper, when plated with noble metals such as gold or platinum to render them unreactive; and a composite material composed of a corrosion-resistant metal powder, a base metal powder plated with a corrosion-resistant metal, or other chemically inert electrically conducting powders, such as graphite, boron carbide, etc., bonded together with a suitable polymeric binder to produce a conducting plate.

Suitable polymeric binders include thermoplastic resins suitable for injection molding such as Kynar, a trademark for a polyvinylidene fluoride material manufactured by Penwalt.

Typical composites include 90-70% high purity graphite powder and 10-30% of polyvinylidene fluoride.

Figure 2:
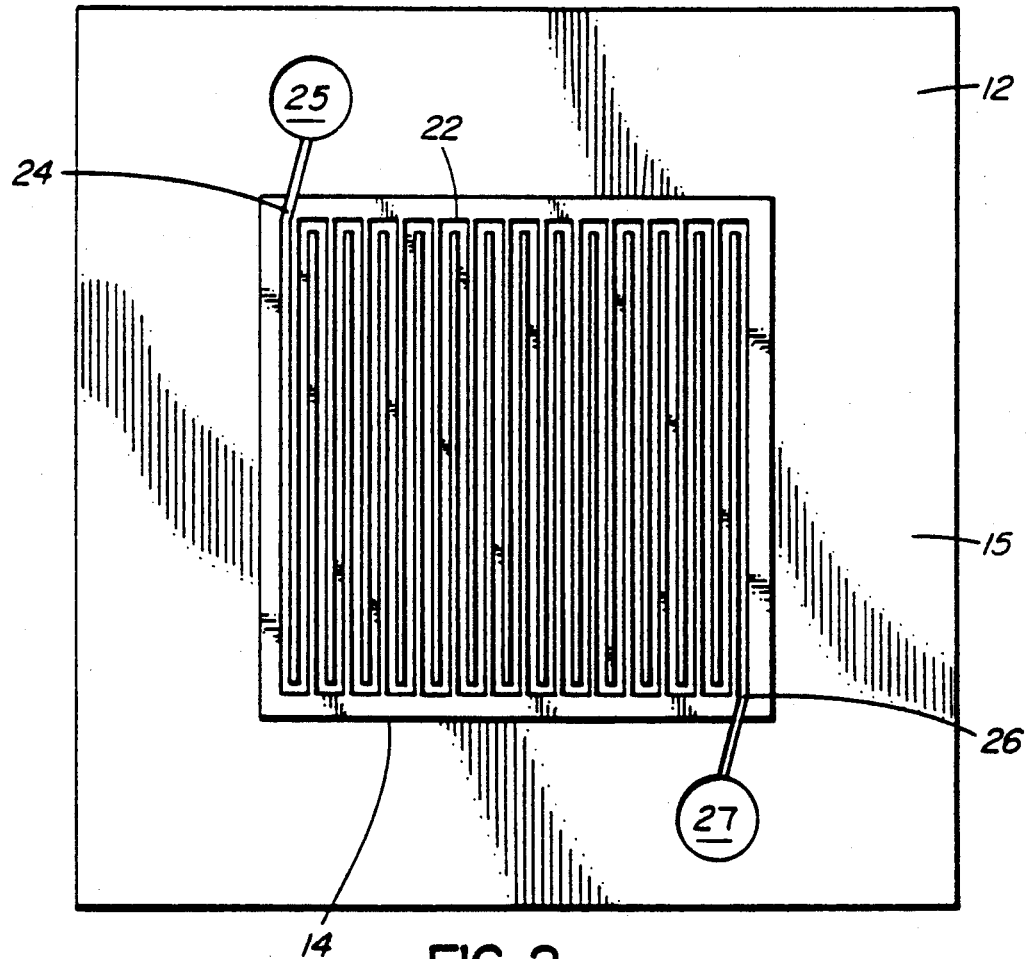
FIG. 2 is a plan view of a fluid flow field plate according to the present invention showing one embodiment of a continuous traversing groove in the plate.

As best seen in FIG. 2, major plate surface 15 has formed therein (typically by numerical control machining, stamping, or molding) a single continuous fluid flow channel 22, said channel having a fluid inlet 24 at one end and a fluid outlet 26 at the other end. The fluid inlet 24 is directly connected to a fluid supply opening 25 in the plate, and the fluid outlet 26 is directly connected to a fluid exhaust opening 27 in the plate. The open-face 23 of the channel extends along its entire length. The fluid opening is connected to a source of fuel (not shown) for the plate adjacent the anode or a source of oxidant (not shown) for the plate adjacent the cathode. It is seen that the channel 22 traverses in a plurality of passes a major central area of the plate 12, corresponding to the area of the anode or cathode to which it is adjacent when assembled. In the embodiment illustrated, the channel follows a serpentine path. Non-serpentine channel arrangements may be used, provided that they are continuous. To maximize the coverage of the electrode surface, the channel traverses the plate in a plurality of alternating longer and shorter closely spaced passes. Preferably the plates are arranged such that the longer passes of one plate are disposed substantially at right angles to the longer passes in the opposing plate. This is to eliminate the difficulties in matching opposing plate surfaces and to permit the use of different flow field structures on opposing plates.

Figure 3:
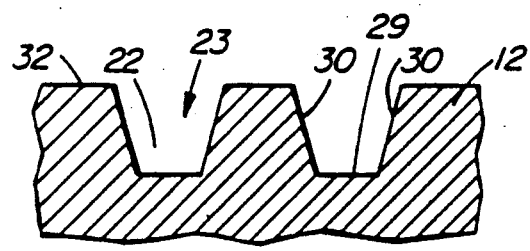
FIG. 3 is an end section detail of FIG. 2 showing the groove on an enlarged scale.

In FIG. 3, the channel is illustrated in cross-section. The channel 22 is seen to be defined by a flat base 28 and opposing sidewalls 30 which diverge outwardly from the base toward the openface 23. The shape of the channel is generally not critical. For example, the base could be rounded to form a U-shaped channel. The channel is shaped as illustrated to minimize tool wear. Preferably, the channel is of uniform depth throughout its length. A design in which the sidewalls converge toward the open-face would be less desirable. A series of substantially parallel lands 32 is thus defined between the longer channel passes. This design also enhances accurate machining of the channel.

When assembled, the lands 32 between the channels on the plate adjacent the anode are in contact with the anode and the lands 32 between the channels on the plate adjacent the cathode are in contact with the cathode. Accordingly, the electrically conducting plates also function as current collectors.

In general, the width of the open-face of the channel is in the range of 0.030 to 0.240 inches. A preferred range is 0.040 to 0.100 inches; the most preferred range being 0.045 to 0.055 inches. For most applications, an open-face width of about 0.050 inches has been found acceptable.

We also find it desirable that the open-face of the channel is somewhat wider than the lands. Generally, land widths in the range of 0.010 to 0.200 inches are contemplated. A preferred range is 0.020 to 0.100 inches; the most preferred range being from 0.035 to 0.055 inches. We typically use a land width of about 0.040 inches.

With regard to channel depths, we contemplate a range of 0.010 to 0.250 inches. A preferred range is 0.030 to 0.150 inches; the most preferred range being 0.040 to 0.080 inches. The typical channel depth is about 0.050 inches.

It will be appreciated that the aforementioned dimensions represent a compromise between electrochemical performance and the mechanical strength requirements for supporting the electrodes. Accordingly, the dimensions are variable within the stated ranges, depending upon the application.

The channels may include a suitable hydrophobic coating thereon to reduce wetting effects. Suitable hydrophobic coatings include polymers such as polytetrafluoroethylene and silicone.

In operation, the fluid flow field plate adjacent the anode supplies fuel, in this case hydrogen-rich gas, to the anode and the fluid flow plate adjacent the cathode supplies an oxidant (either pure oxygen or air) to the cathode. By employing a single continuous channel which traverses the plate and hence the adjacent electrode surface in a plurality of alternating longer and shorter closely spaced passes, access of adequate fuel and oxidant gases to substantially the entire anode and cathode surfaces, respectively, is assured.

As indicated above, because the operating temperature of the cell is below the boiling point of water at the operating pressure, and an immobile solid electrolyte is used, water formed as reaction product is expelled from the cathode into the gas stream as a liquid. Accordingly, in order to provide efficient cell performance, the liquid water must be removed as it is formed in order to avoid blocking of the channels (a prior art problem) which interferes with access of oxygen to the cathode. Applicant's novel continuous channel approach ensures that water formed is conveyed by gas flow through the channel and is exhausted from the cell. Accordingly, no dead spots can form at any point of the operating surface of the cathode due to water collection.

The present invention permits ready removal of water as it forms in the channel. In particular, the channel design encourages movement of the water before it can coalesce to the point that a large water droplet forms and considerable force is then required to remove the formed droplet. The flow of the oxidant gas, typically oxygen, moves the water along the channel.

Moreover, when operating on air as the oxidant, the oxygen in the air is consumed, reducing the oxygen partial pressure in the air. The cell performance is sensitive to oxygen partial pressure. To compensate in part, the flow rate is increased when using air. Moreover, to have high, stable performance using air it is desirable to have as uniform an oxygen partial pressure along the entire length of the channel and hence across the cell, as possible. Since the achievement of uniform oxygen partial pressure is not practical, the next best thing is a uniform and controlled oxygen partial pressure drop across the cell. This can be accomplished using the fluid flow field plate of the present invention.

More specifically, since the air has a single channel to flow through it is thus uniformly distributed. Because the uniform distribution is sequential the oxygen concentration is the highest at the feed and falls linearly across the length of the flow channel. This is highly advantageous because the oxygen concentration at any point can be calculated or measured and thus controlled with accuracy.

EXAMPLES

EXAMPLE 1

A fuel cell containing a cathode and an anode flow field plate of the prior art (i.e. the aforementioned General Electric separate parallel flow channel arrangement) and a standard membrane electrolyte/electrode assembly, with an active electrode area of 0.05 ft$^2$, was operated on hydrogen and air at an air flow rate of 3.18 ft$^3$/hr. After one hour of operation across a fixed resistive load of 0.0225 ohm, at a temperature of 130° F., the following performance was recorded.

| Current Density (A/ft$^2$) | Cell Terminal Voltage (V) | Areal Power Density (W/ft$^2$) |
| --- | --- | --- |
| 333 | 0.417 | 139 |

EXAMPLE 2

All experimental conditions were exactly the same as in Example 1 except that the cathode flow field plate was replaced with a flow field plate of the present invention as shown in FIG. 2. After one hour of operation, across the same fixed resistive load, the following performance was recorded.

| Current Density (A/ft$^2$) | Cell Terminal Voltage (V) | Areal Power Density (W/ft$^2$) |
| --- | --- | --- |
| 408 | 0.500 | 204 |

It will be noted that using the current invention, the power available from the fuel cell has been increased by about 50%.

Thus, in the present invention, in its use of the single continuous pathway, for example, the serpentine traversing pathway illustrated in FIG. 2, water is effectively removed from the cell by the maintenance of excess oxidant and hydrogen gas flows. Water may be produced on the hydrogen side due to condensation, or other factors, but the main water formation takes place on the oxidant side. As the water is produced, it is forced along the length of the pathway by the excess gas flow and expelled from the cell. Particularly with the single serpentine path, even if liquid water accumulates in the channel, the water is removed. Use of a single serpentine channel path also ensures that no "channelling" at any point in the operating area of the surface of the plate can occur, and dead spots are avoided because water is continuously flushed from the operating surface of the electrode. It will thus be appreciated that although water formation and uniform (controlled) oxygen access are problems which affect mainly the cathode side, the novel plate design is also useful on the anode side.

While not shown, in multi-cell arrangements the other major surface of the plate may also include a continuous traversing channel. The two flow fields on opposite sides of such a single so-called "bi-polar" plate supply the fuel gas to the anode of one cell and the oxidant gas to the cathode of the adjacent cell.

For higher current density applications, particularly when operating on air as oxidant or with very large fluid flow field plates (active electrode areas of about 0.25 ft$^2$ per cell) the single continuous channel has limitations. The increased gas flow required for good performance on the cathode side results in a large pressure drop from the feed inlet to the exhaust outlet of the channel. It is thus desirable when operating on air to limit the pressure drop through the cell and thus minimize the parasitic power required to pressurize the air. Accordingly, several continuous separate flow channels may be provided which traverse the plate typically in substantially the same serpentine manner.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A fluid flow field plate for use in a solid polymer electrolyte fuel cell, said plate being made of a suitable electrically conducting material and formed in a major surface thereof a single continuous open-faced fluid flow channel, said channel having a fluid inlet at one end and a fluid outlet at the other end, wherein said channel traverses a major central area of said surface in a plurality of passes, and wherein said plate further includes a fluid supply opening and a fluid exhaust opening defined in said surface and directly connected to said fluid inlet and to said fluid outlet, respectively.

2. A fluid flow plate according to claim 1, wherein the channel follows a serpentine traversing path.

3. A fluid flow plate according to claim 1, wherein the channel traverses the major surface of the plate in a plurality of alternating closely spaced longer and shorter passes.

4. A fluid flow plate according to claim 1, wherein in said major surface, adjacent channel passes are separated by lands.

5. A fluid flow plate according to claim 1, wherein a channel is formed in both major surfaces of the plate.

6. A fluid flow plate according to claim 1, wherein the plate is a rigid non-porous graphite plate.

7. A fluid flow plate according to claim 1, wherein the channel comprises a base and opposing side walls diverging outwardly from said base toward said open-face.

8. A fluid flow plate according to claim 7, wherein the base of the channel is flat.

9. A fluid flow plate according to claim 1, wherein the channel is of uniform depth throughout the length of the channel.

10. A fluid flow plate according to claim 1 wherein the channel includes a hydrophobic coating thereon.

11. A fluid flow plate according to claim 10, wherein the hydrophobic coating is selected from the group consisting of polytetrafluoroethylene and silicone.

12. A fluid flow plate according to claim 1, wherein the major central area of the plate is recessed to accommodate an electrode of said fuel cell.

13. A fluid flow plate according to claim 12, wherein opposing plates in said fuel cell include matching recesses.

14. A fluid flow plate according to claim 4, wherein the lands are of a width less than the width of the open-face of the channel.

15. A fluid flow plate according to claim 14, wherein the width of the open-face of the channel is in the range of 0.030 to 0.240 inches.

16. A fluid flow plate according to claim 15, wherein the land width is in the range of 0.010 to 0.200 inches.

17. A fluid flow plate according to claim 16, wherein the width of the open-face of the channel is in the range of 0.40 to 0.100 inches.

18. A fluid flow plate according to claim 17, wherein the width of the open-face of the channel is in the range of 0.045 to 0.055 inches.

19. A fluid flow plate according to claim 18, wherein the width of the open-face of the channel is about 0.050 inches.

20. A fluid flow plate according to claim 16, wherein the land width is in the range of 0.020 to 0.100 inches.

21. A fluid flow plate according to claim 20, wherein the land width is in the range of 0.035 to 0.055 inches.

22. A fluid flow plate according to claim 20, wherein the land width is about 0.040 inches.

23. A fluid flow plate according to claim 1, wherein the suitable electrically conducting material is selected from the group consisting of graphite; a corrosion-resistant material; a base metal plated with a corrosion resistant metal; and a composite material composed of a corrosion-resistant metal powder, a base metal powder plated with a corrosion resistant metal or other chemically inert electrically conducting powders, bonded together with a suitable binder.

24. A fluid flow plate according to claim 23, wherein the suitable electronically conducting material is graphite.

25. A fluid flow plate according to claim 23, wherein the suitable electronically conducting material is niobium.

26. A fluid flow plate according to claim 23, wherein the suitable binder is polyvinylidene fluoride.

27. A fluid flow plate according to claim 23, wherein the composite material composes 10-30%/w of polyvinylidene fluoride and 90-70%/w of graphite powder.

28. A fluid flow plate according to claim 16, wherein the channel depth is in the range of 0.010 to 0.250 inches.

29. A fluid flow plate according to claim 28, wherein the channel depth is in the range of 0.030 to 0.150 inches.

30. A fluid flow plate according to claim 29, wherein the channel depth is in the range of 0.040 to 0.080 inches.

31. A fluid flow plate according to claim 30, wherein the channel depth is about 0.050 inches.

32. A fluid flow plate according to claim 1, wherein the width of the open-face of the channel is in the range of 0.030 to 0.240 inches.

33. A solid polymer electrolyte fuel cell comprising:
an anode;
a cathode;
a solid polymer electrolyte sandwiched between said anode and cathode; and
a pair of opposing fluid flow field plates in respective operative association with said anode and cathode, one of said field plates having a first fluid flow field adjacent said anode for supplying fuel thereto and exhausting reaction products therefrom, and the other of said field plates having a second fluid flow field adjacent said cathode for supplying an oxidant thereto and exhausting reaction products therefrom, wherein
said fluid flow field plates are each made of a suitable electrically conducting material and define in a major surface thereof a single continuous open-faced fluid flow channel corresponding respectively to said first and second fluid flow fields;
each said channel having a fluid inlet at one end and a fluid outlet at the other end, said channel traversing a major central area of said surface in a plurality of passes, and wherein
each said fluid flow field plate further includes a fluid supply opening and a fluid exhaust opening defined in said surface and respectively directly connected to said fluid inlet and to said fluid outlet of each said channel.

34. A fuel cell as in claim 33, wherein each said channel follows a serpentine traversing path.

35. A fuel cell as in claim 33, wherein each said fluid flow plate is a rigid non-porous graphite plate.

36. A fuel cell as in claim 33, wherein at least one of said fluid flow plates has a major central area that is recessed to accommodate at least one of said anode and cathode.

* * * * *